Figure 1:
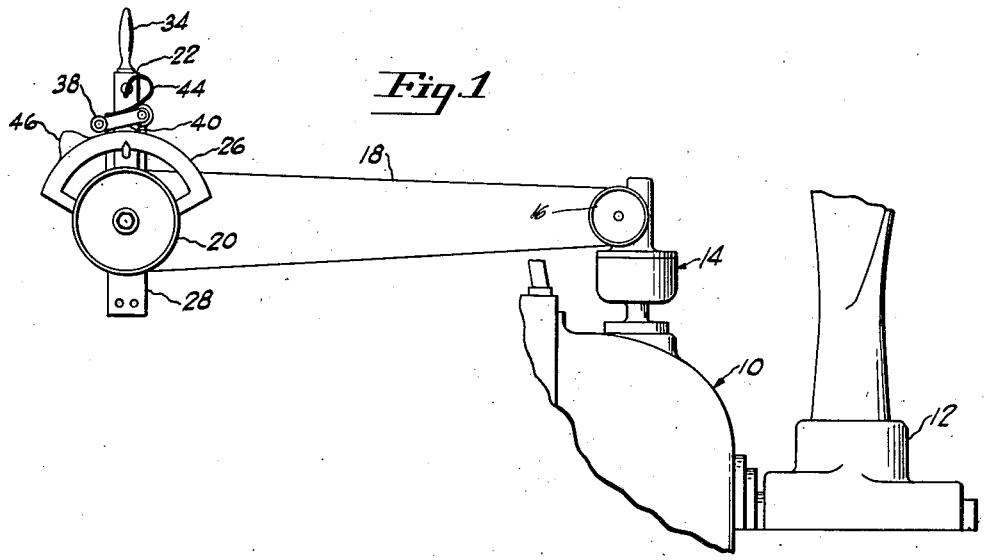

Oct. 22, 1940.   F. W. CALDWELL   2,219,087
SPEED CONTROLLING MEANS
Filed June 25, 1938

INVENTOR.
Frank W. Caldwell
BY Harris G. Luther
ATTORNEY

Patented Oct. 22, 1940

2,219,087

UNITED STATES PATENT OFFICE 2,219,087

SPEED CONTROLLING MEANS

Frank W. Caldwell, Hartford, Conn., assignor to United Aircraft Corporation, East Hartford, Conn., a corporation of Delaware Application June 25, 1938, Serial No. 215,935

2 Claims. (Cl. 264—3)

This invention relates to improvements in speed controlling means and has particular reference to means for controlling the speed of an engine or motor and preventing operation of the engine or motor at a speed at which undesirable or dangerous vibrations occur.

An object of the invention resides in the provision of a speed controlling means for an engine or motor which is effective to cause the engine or motor to operate at any selected speed within a given range except certain predetermined speeds at which vibrational forces set up by the engine or motor approach a dangerous magnitude or tend to resonate with other elements to produce a dangerous or disagreeable vibrational effect.

A further object resides in the provision of simple and effective means for eliminating undesirable predetermined speeds from the operating speeds of an engine or motor.

Other objects and advantages will be more particularly pointed out hereinafter or will become apparent as the description proceeds.

In the accompanying drawing in which like reference numerals are used to designate similar parts throughout, there is illustrated a suitable mechanical arrangement for disclosing the invention. The drawing, however, is for the purpose of illustration only and is not to be taken as limiting or restricting the scope of the invention as set forth in the appended claims.

In the drawing Fig. 1 is a partly schematic illustration showing a device constructed according to the invention connected with the governor of a propeller driving engine.

Figure 3:
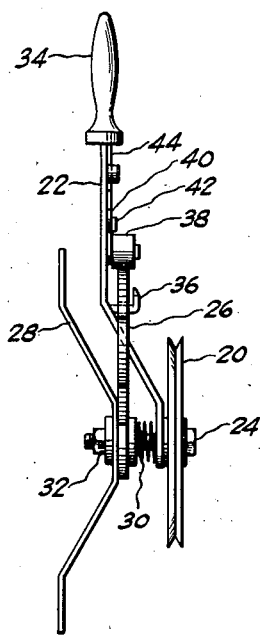
Figure 2:
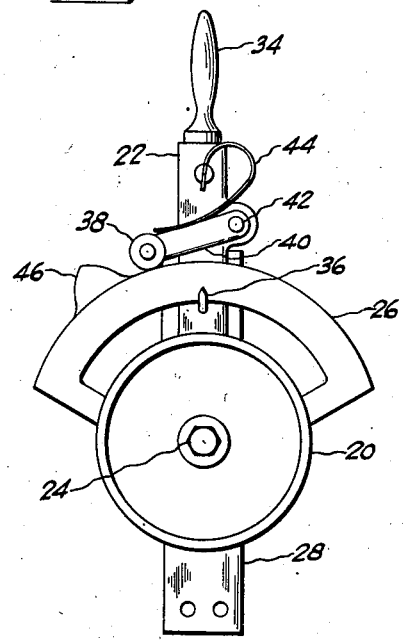

Fig. 2 is an elevational view on an enlarged scale of the control device illustrated in Fig. 1 and Fig. 3 is a side elevational view of the device illustrated in Fig. 2.

Referring to the drawing in detail the numeral 10 generally indicates a prime mover such as an aircraft engine. The operating speed of the engine 10 may be maintained constant at a selected value by the action of a controllable pitch propeller generally indicated at 12 under the control of a speed responsive governor generally indicated at 14 in a manner well known to the art. The governor 14 is made adjustable and by manually adjusting the governor any desired engine speed, within the operative range of the governor, may be selected. In the form illustrated the governor is adjusted by rotation of the pulley 16 by the cable 18, the cable being moved to rotate the pulley 16 by the rotation of a second pulley 20 upon movement of the manually actuatable lever 22.

Since engine vibration, and particularly the torsional vibration of an internal combustion engine, occurs as a combination of a number of vibration harmonics each bearing a definite proportional relation to engine rotation it happens that certain of these harmonic frequencies are much more pronounced at certain engine speeds than at others. Thus a vibration harmonic or frequency which is not particularly objectionable at most engine speeds may become dangerous at some particular engine speed at which it comes into resonance with some other part of the system such, for instance, as the propeller or the engine and propeller combination. As stated above it is among the objects of this invention to avoid operating the engine at the particular speed at which a dangerous vibration may be set up.

The pulley 20 is rotatably mounted upon a headed shaft or bolt 24 and the pivoted end of the lever 22 is rigidly secured to the pulley at some location near the shaft. In the construction illustrated the pivoted end of the lever also surrounds the shaft and is connected to the pulley hub immediately surrounding the shaft. The shaft 24 passes through the acute portion of a quadrant 26 through a bracket 28 and is provided intermediate its length with an annular enlargement 30 which cooperates with the nut 32 to clamp the quadrant and bracket together and simultaneously secure the shaft to the bracket when the nut is screwed up on the threaded end of the shaft. In the construction illustrated the lever 22 passes through the quadrant and extends beyond it and is provided at its outer end with a handle 34 by means of which the lever may be moved to rotate the pulley 20. If desired a pointer 36 may be secured to the lever 22 in position to move along the face of the quadrant and indicate the instant engine speed by its location with relation to suitable indicia upon the face of the quadrant.

A cam follower in the form of a roller 38 carried upon the free end of a link 40 pivotally secured at its other end to the lever 22, rolls along the peripherial surface of the quadrant and is pressed into contact therewith by a suitable spring 44. At a location along the quadrant occupied by the roller 38 when the pointer 36 indicates a position of the lever 22 at which the dangerous or otherwise undesirable engine speed occurs, the quadrant is provided with a tapered outwardly directed radial extension or cam 46. When the roller 38 passes over this extension the increased resistance to movement of the lever 22 notifies the operator that he is passing over the dangerous speed condition. At the same time the reaction between the roller follower and the cam, due to the force of the spring 44, will cause the roller to roll down the side of the extension with which it is in contact and thereby move the lever 22 in one direction or the other past the critical speed position described above in the event the lever should be released at the critical speed position. Thus the governor cannot be accidentally adjusted to maintain the engine speed at the undesirable or dangerous value but will automatically be forced to one side or the other of that particular speed value.

While a very simple and relatively crude arrangement has been illustrated for the purpose of disclosing the invention it is to be understood that various forms of mechanisms embodying the same general principle may be utilized without in any way exceeding the scope of the invention. For example, the roller carrying member could be a slidable link as well as a pivoted link and the extension or cam 46 does not have to be applied directly to the quadrant 26 but could be used in connection with some other part of the mechanism by which the governor is adjusted. By thus avoiding the relatively few operating speeds at which the dangerous condition occurs it is possible to utilize a wide range of engine speed without danger of trouble or annoyance from vibrational effects even though the operator is not familiar with the bad vibration points of the particular engine propeller combination. The arrangement also relieves the operator from the necessity of constantly checking the engine speed to avoid the vibration points or as to being continuously on the alert for a noticeable vibration effect.

While a particular mechanical arrangement has been illustrated for the purpose of disclosing the invention, it is to be understood that the invention is not limited to the particular arrangement so illustrated and described, but that such changes in the size, shape and arrangement of parts may be resorted to as come within the scope of the sub-joined claims.

Having now described the invention so that others skilled in the art my clearly understand the same, what it is desired to secure by Letters Patent is as follows.

What is claimed is:

1. In an engine speed control mechanism including a constant speed regulating device and manually operable speed selecting means having a movable element operatively connected with said speed regulating means to adjust the same, means for eliminating a vibration producing speed from the operative speed range of said engine comprising, a fixed cam, a cam follower carried by a movable element, and a spring carried by said movable element for actuating said cam follower to automatically move said element past said cam in the event said manually operable means is released at a setting to produce said vibration producing speed.

2. In an engine speed control mechanism including a constant speed regulating device and manually operable speed selecting means having a movable lever operatively connected with said speed regulating means to adjust the same, and a quadrant guide for said lever, means for eliminating a critical vibration producing speed from the operative speed range of said engine comprising, a tapered extension on said quadrant, a roller movably carried by said lever in position to ride over said extension, and a spring for actuating said roller against said tapered extension in the event said lever is released at the critical speed setting to automatically move said lever past a position corresponding to said vibration producing speed.

FRANK W. CALDWELL.